(12) United States Patent  (10) Patent No.: US 7,693,387 B2
Weinegger et al.  (45) Date of Patent: Apr. 6, 2010

(54) CABLE MANAGEMENT SYSTEM

(75) Inventors: Mark E. Weinegger, Franklin, MA (US); Theodore Datri, Millis, MA (US); Matt Hannett, Whitinsville, MA (US)

(73) Assignee: C.E. Communication Systems, Inc., Franklin, MA (US)

( * ) Notice: Subject to any disclaimer, the term of this patent is extended or adjusted under 35 U.S.C. 154(b) by 0 days.

(21) Appl. No.: 12/099,126

(22) Filed: Apr. 7, 2008

(65) Prior Publication Data

US 2008/0292260 A1 Nov. 27, 2008

Related U.S. Application Data

(60) Provisional application No. 60/910,360, filed on Apr. 5, 2007.

(51) Int. Cl.
*G02B 6/00* (2006.01)
(52) U.S. Cl. .................. 385/135; 385/134; 385/136
(58) Field of Classification Search .......... 385/135–136
See application file for complete search history.

(56) References Cited

U.S. PATENT DOCUMENTS

| 5,109,467 A | | 4/1992 | Hogan et al. |
| 5,323,480 A | | 6/1994 | Mullaney et al. |
| RE35,030 E | * | 8/1995 | Siemon et al. ............. 439/532 |
| 5,448,015 A | * | 9/1995 | Jamet et al. ................ 174/68.3 |
| 5,546,495 A | | 8/1996 | Bruckner et al. |
| 5,575,665 A | * | 11/1996 | Shramawick et al. ......... 439/49 |
| 5,790,740 A | | 8/1998 | Cloud et al. |
| 5,918,837 A | * | 7/1999 | Vicain ......................... 248/49 |
| 5,933,563 A | | 8/1999 | Schaffer et al. |
| 6,009,223 A | * | 12/1999 | Arizpe ......................... 385/134 |
| 6,170,784 B1 | * | 1/2001 | MacDonald et al. .......... 248/65 |
| 6,275,640 B1 | | 8/2001 | Hunsinger et al. |
| 6,285,565 B1 | * | 9/2001 | Åberg et al. ................ 361/826 |
| 6,340,317 B1 | * | 1/2002 | Lin ............................ 439/713 |

(Continued)

OTHER PUBLICATIONS

NorfolkWire & Electronic Cable Control Cable Management Tools: CABLECONTROL™ www.connectworld.net/bulkcable/cablecontrol.html.

(Continued)

*Primary Examiner*—Ryan Lepisto
(74) *Attorney, Agent, or Firm*—Grossman Tucker Perreault & Pfleger, PLLC (57) ABSTRACT

A cable management system for use with a rack having at least a first and a second side configured to be coupled to at least one piece of electronic equipment comprises a first and a second support configured to be disposed along at least a portion of a first and a second side of the rack. The first and second supports each include a strut configured to be secured to a respective side of the rack and an arm support including at least one mounting area. The cable management system also comprises a plurality of arms configured to be removably coupled to the mounting areas of the first and second arm supports. At least one of arms comprises a first and a second row of notches arranged in a first and a second direction, respectively. The first and second rows of notches are configured to engage with at least one cable associated with said at least one piece of electronic equipment.

25 Claims, 8 Drawing Sheets

U.S. PATENT DOCUMENTS

| | | | |
|---|---|---|---|
| 6,396,990 B1 | 5/2002 | Ehn et al. | |
| 6,396,992 B1 * | 5/2002 | Debal | 385/135 |
| 6,423,898 B1 * | 7/2002 | Croker | 174/50 |
| 6,533,470 B2 | 3/2003 | Ahrens | |
| 6,543,940 B2 | 4/2003 | Chu | |
| 6,556,762 B1 * | 4/2003 | Erickson et al. | 385/134 |
| 6,568,542 B1 * | 5/2003 | Chen | 211/26 |
| 6,621,974 B1 | 9/2003 | Chu | |
| 6,724,970 B2 | 4/2004 | Adapathya et al. | |
| 7,027,706 B2 * | 4/2006 | Diaz et al. | 385/135 |
| 7,091,418 B1 * | 8/2006 | Clark et al. | 174/72 A |
| 7,139,462 B1 * | 11/2006 | Richtman | 385/137 |
| 7,171,098 B2 * | 1/2007 | Weinegger | 385/134 |
| 7,345,241 B2 * | 3/2008 | Caveney et al. | 174/99 R |
| 7,352,947 B2 * | 4/2008 | Phung et al. | 385/135 |
| 7,404,736 B2 * | 7/2008 | Herbst et al. | 439/557 |
| 2003/0123832 A1 | 7/2003 | Adapathya et al. | |
| 2003/0185536 A1 | 10/2003 | Steinman | |
| 2007/0031102 A1 * | 2/2007 | McNutt et al. | 385/135 |

OTHER PUBLICATIONS

NorfolkWire & Electronic Cable Control Cable Management Tools: Rack & Wire Managers www.connectworld.net/bulkcable/relay—rack—wire—managers.html.

* cited by examiner

CABLE MANAGEMENT SYSTEM

CROSS-REFERENCE TO RELATED APPLICATION

This application claims the benefit of U.S. Provisional Patent Application Ser. No. 60/910,360, entitled "Cable Management System" filed on Apr. 5, 2007, which is fully hereby incorporated by reference.

FIELD

The present disclosure relates to managers and organizers, and more particularly pertains to cable organizers and managers for use with network switches.

BACKGROUND

Many electrical components are grouped together and stored in racks or the like. These electrical components, such as network switches and the like, may include a plurality of cables and wires. For example, a network rack of Cisco 6509® switches may include 288 cables just for the networking features alone.

From time to time, it may be necessary to remove and/or replace one of the electrical components in the rack. To remove a component from the rack, it may be necessary to disconnect one or more (often all) of the cables and wires associated with the component. As may be appreciated, this may be a time consuming and labor intensive process. The process may be further complicated if the plurality of wires and cables associated with the rack are not organized in a logical manner. A technician may spend a considerable amount of time tracking down, labeling, and/or organizing the multitude of cables and wires associated with a single component. In some situations, it may even be necessary to disconnect (either partially disconnect or totally disconnect) and/or remove other additional components in the rack to simply remove a first component in question. Not only may this directly increase the cost associated with the removal of the component, but it may also significantly increase the down time and loss of productivity, particularly if one or more of the components need to be replaced due to damage, inoperability, or the like.

Moreover, in the process of reinstalling all of the cables and wires associated one or more components may also be a time consuming and labor intensive process. Again, as may be appreciated, it may be necessary to connect the cables and wires to the various components in a predefined manner. If one or more of the cables or wires is improperly connected (for example, a cable or wire is connected to the wrong port), the overall performance of the component may be negatively affected.

BRIEF DESCRIPTION OF THE DRAWINGS

Features and advantages of the claimed subject matter will be apparent from the following description of embodiments consistent therewith, which description should be considered in conjunction with the accompanying drawings, wherein:

DESCRIPTION

Figure 1:
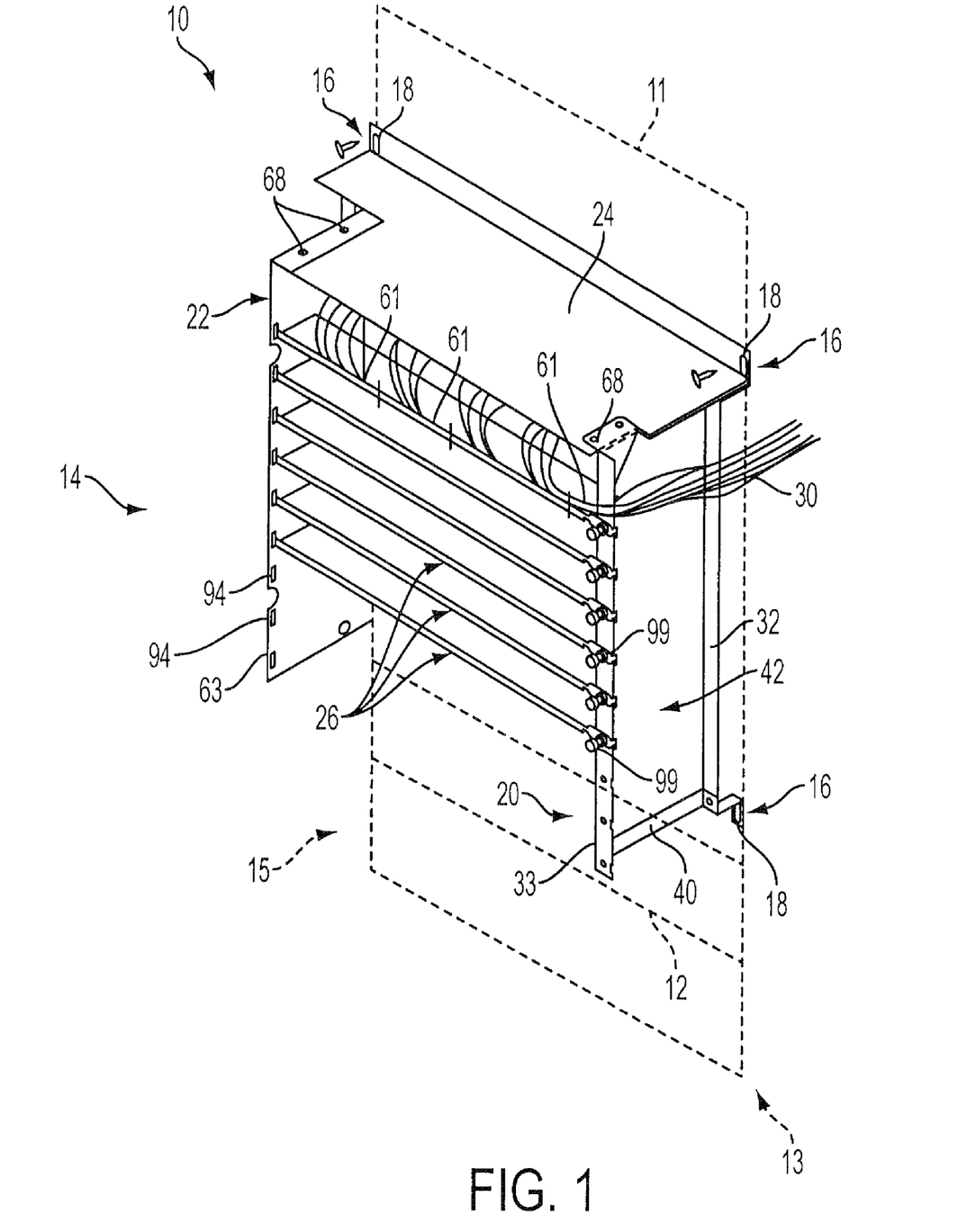
FIG. 1 is a perspective view of an embodiment of a cable management system consistent with the present disclosure.

Referring to FIG. 1, a perspective view of one embodiment of a cable management system 10 is depicted. As shown, cable management system 10 may be configured to be disposed proximate to a rack 11 configured to contain one or more switches 12, such as, but not limited to, Cisco® 6509 switches or the like. While the present disclosure will be described with respect to a Cisco® 6509 switch, it is to be understood that this is for illustrative purposes only. The cable management system may be used with other switches as well as other components mounted or otherwise secured to a rack 11 such as, but not limited to, audio and/or visual components, telephony equipment, as well as other computer related devices. Any modifications necessary to adapt the cable management system 10 for use with different racks and different equipment are within the knowledge of one of ordinary skill in the art.

The cable management system 10 may comprise a frame 14 configured to be coupled, mounted, or otherwise secured to at least a portion of the rack 11 and a plurality of arms 26 configured to be removably coupled to the frame 14. As will be explained in greater detail hereinbelow, the cable managements system 10 according to one embodiment may be configured to organize and/or manage a plurality of cables or wires 30 (hereinafter collectively referred to as cables 30) associated with at least one switch 12.

Consistent with one aspect of the present disclosure, the frame 14 may include a first and a second support 20, 22 configured to be disposed about a first and a second side 13, 15, respectively, of the rack 11 (for example, a first and a second vertical side of the rack 11). For example, the first and second supports 20, 22 may each include at least one mounting device 16 for removably coupling, mounting, or otherwise securing the frame 14 to at least a portion of the rack 11.

The mounting device 16 may be provided in a manner that facilitates removal and/or installation of the switches 12 and/or other components in the rack 12. In the illustrated embodiment, the mounting device 16 may include one or more apertures, holes or openings 18 in the first and second supports 20, 22 configured to receive a fastener (such as, but not limited to, a bolt, screw, nut, or the like) for coupling the frame 14 to the rack 11. The mounting device 16 may be configured to be coupled to a front outer face of the rack 11 and/or a side portion of the rack 11. According to another aspect, at least a portion of the frame 14 may be provided as an integral feature of the rack 12 or may be permanently secured to the rack 11 using an adhesive, welding, or the like.

The first and/or and second supports 20, 22 may be configured to extend generally outwardly from the rack 11 a predefined distance therefrom. The distance in which the first and second supports 20, 22 extend outwardly may be based on, at least in part, the number of cables 30, the size or gauge of the cables 30, the bend radius of the cables 30, the amount of space necessary for maintenance and/or installation/removal of the switches 12, as well as other space and/or equipment considerations such as, but not limited to, doors or the like (not shown) which may be disposed about the front of the rack 11. The first and second supports 20, 22 may also have various lengths depending on the intended application. The cable management system 10 may be configured to manage cables 30 associated with one or more switches 12. For example, the first and second supports 20, 22 may have a length of approximately 17.3 inches. However, those skilled in the art will recognize that the first and/or second supports 20, 22 may include other lengths.

Figure 2:
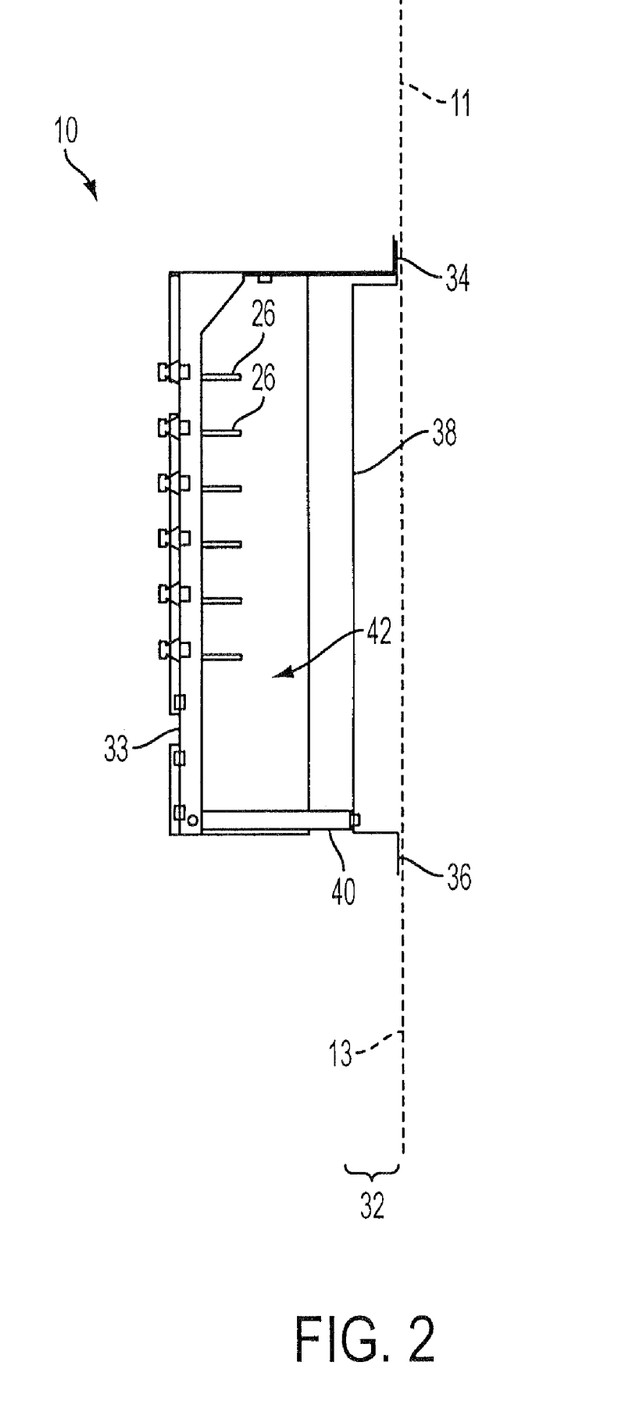
FIG. 2 depicts an end view of a cable management system consistent with the present disclosure.

According to one aspect, the first support 20, FIGS. 1 and 2, may include a strut 32 which may be configured to be disposed along at least a portion of the first side 13 of the rack 11. The strut 32 may include a first and a second base 34, 36 which may each be provided with at least one mounting device 16 (for example, the apertures or slots 18 configured to receive one or more fasteners) to couple the first support 20 to the first side 13 of the rack 11. The first and second bases 34, 36 may be provided having a generally "L" shape. The strut 32 may also include one or more support braces 38 coupled to the first and second base 34, 36. The support brace 38 may be disposed a spaced distance outwardly from the first side 13 of the rack 11. For example, the support brace 38 may be coupled to an outer portion of the first and second mounting areas 34, 36. Providing the support brace 38 a spaced distance away from the rack 11 provides increased access to the rack mounting features used to secure switches 12 to the rack, thereby facilitating the removal and/or installation of a switch 12 from the rack 11.

Figure 3:
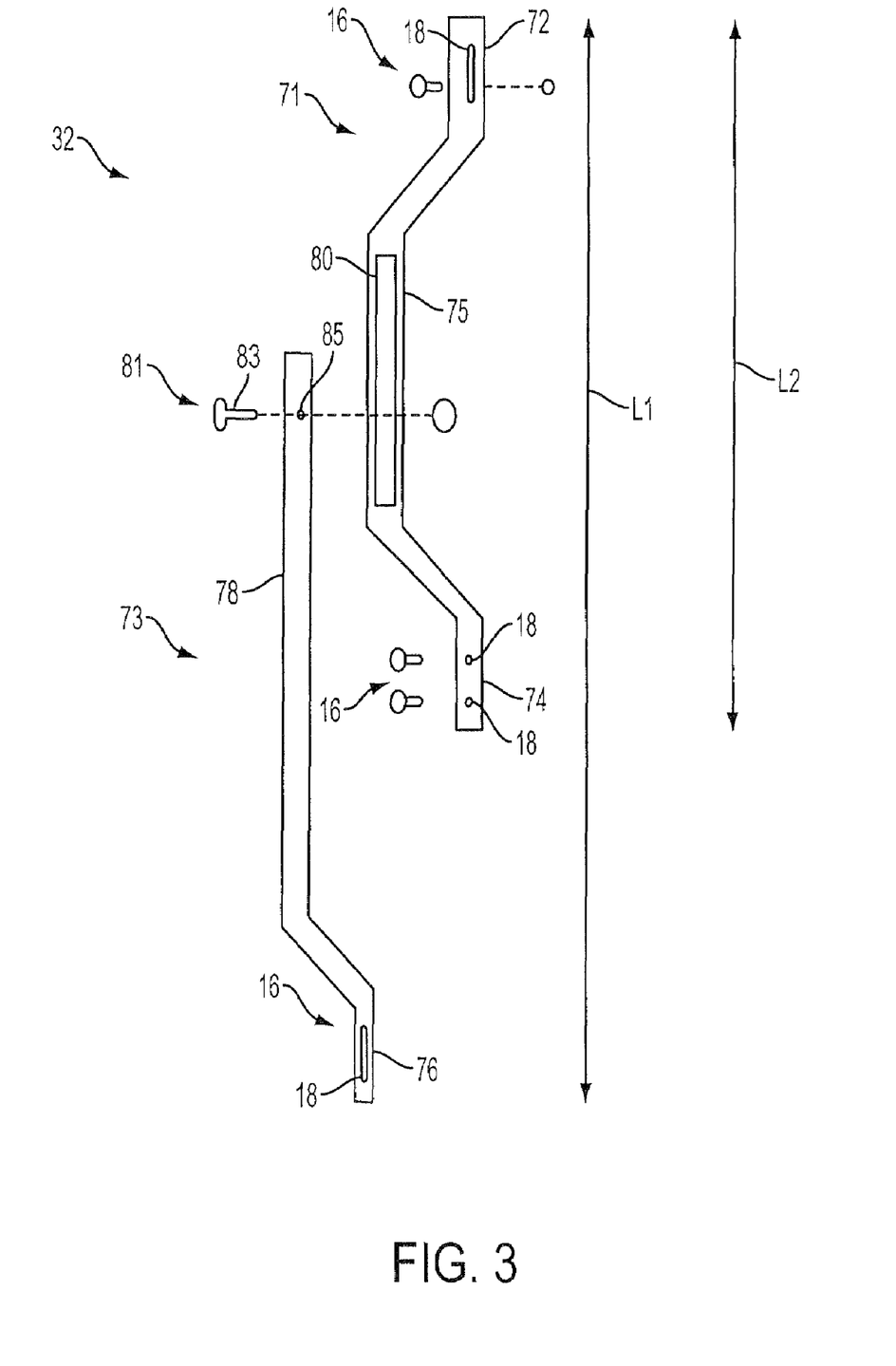
FIG. 3 depicts a perspective view of one embodiment of an adjustable support strut consistent with the present disclosure.

According to another aspect, the strut 32, FIG. 3, may be configured to have an adjustable length L1. As discussed above, the cable management system 10 according to the present disclosure may be used with a wide variety of racks 11. As may be appreciated, the racks 11 may be configured to hold different types of equipment and may have various mounting features and lengths. By adjusting the length L1 of the strut 32, the adjustable strut 32 may be configured to be coupled to a wide range of racks 11. For example, the strut 32 may be provided having a fixed mount portion 71 and an adjustable strut 73. The fixed strut 71 may include a first and a second base 72, 74 having at least one mounting device 16 (for example, the apertures or slots 18 configured to receive one or more fasteners) to couple the fixed strut 71 to the first side 13 of the rack 11. The first and second bases 72, 74 may be provided with a generally "L" or "hockey-stick" like shape. The fixed strut 71 may also include one or more support braces 75 coupled to the first and second base 72, 74. The support brace 75 may be disposed a spaced distance outwardly from the first side 13 of the rack 11. For example, the support brace 75 may be coupled to an outer portion of the first and second mounting areas 72, 74. The fixed strut 71 may be provided having a length L2 such that at least the fixed strut 71 may be coupled to the smallest intended rack 11 application.

The adjustable strut 73 may be provided with a base 76 and an elongated portion 78. The base 76 may be substantially similar to either of the bases 72, 74 described above. The elongated portion 78 may be coupled to an outer portion of the base 76 such that the elongated portion 78 may be provided a spaced distance outwardly from the first side 13 of the rack 11.

In the illustrated embodiment, the fixed strut 71 may be provided with one or more elongated slots or apertures 80 disposed within the support brace 75 and the adjustable strut 73 may be provided having one or more mounting features 81 (such as, but not limited to, a bolt or screw 83 configured to be disposed through an aperture or slot 85 disposed in the elongated portion 78). In practice, the bases 72, 74, 76 of the fixed strut 71 and the adjustable strut 73 may be coupled to at least a portion of the rack 11 using the mounting devices 16 such that the strut 32 is disposed about the intended portion of the rack 11. The fixed strut 71 and the adjustable strut 73 may be coupled to each other using the mounting feature 81 and the slots or apertures 80. As may be now be appreciated, the adjustable strut 73 may be provided with one or more slots or apertures 80 and the fixed strut 71 may be provided with one or more mounting features 81. Other configurations for providing adjustability in the length of the strut 32 are also possible including, but not limited to, a telescopic strut or the like.

Referring back to FIGS. 1 and 2, the first support 20 may also include one or more horizontal supports 40 extending generally outwardly from the rack 11. One end of the horizontal support 40 may be coupled to the first and/or second mounting areas 34, 36 and/or the support brace 38. Another end of the horizontal support 40 may be coupled to a first arm support 33. While the horizontal support 40 is shown extending substantially perpendicular from the first side 13 of the rack 11, other configurations of the horizontal support 40 are also possible. The first arm support 33 may be configured to be disposed substantially along a portion of the length of the first side 13 of the rack 11. For example, the first arm support 33 may be provided substantially parallel to the first side 13 of the rack 11.

As may be seen in FIGS. 1 and 2, the first support 20 may be provided having a generally open area 42. The open area 42 may increase airflow in and out of the rack 11 behind the frame 14 while also providing increased access to the switches 12. Those skilled in the art will now recognize that the first support 20 may be provided having numerous other geometries/configurations. For example, the first support 20 may be provided having a generally solid geometry.

Figure 4:
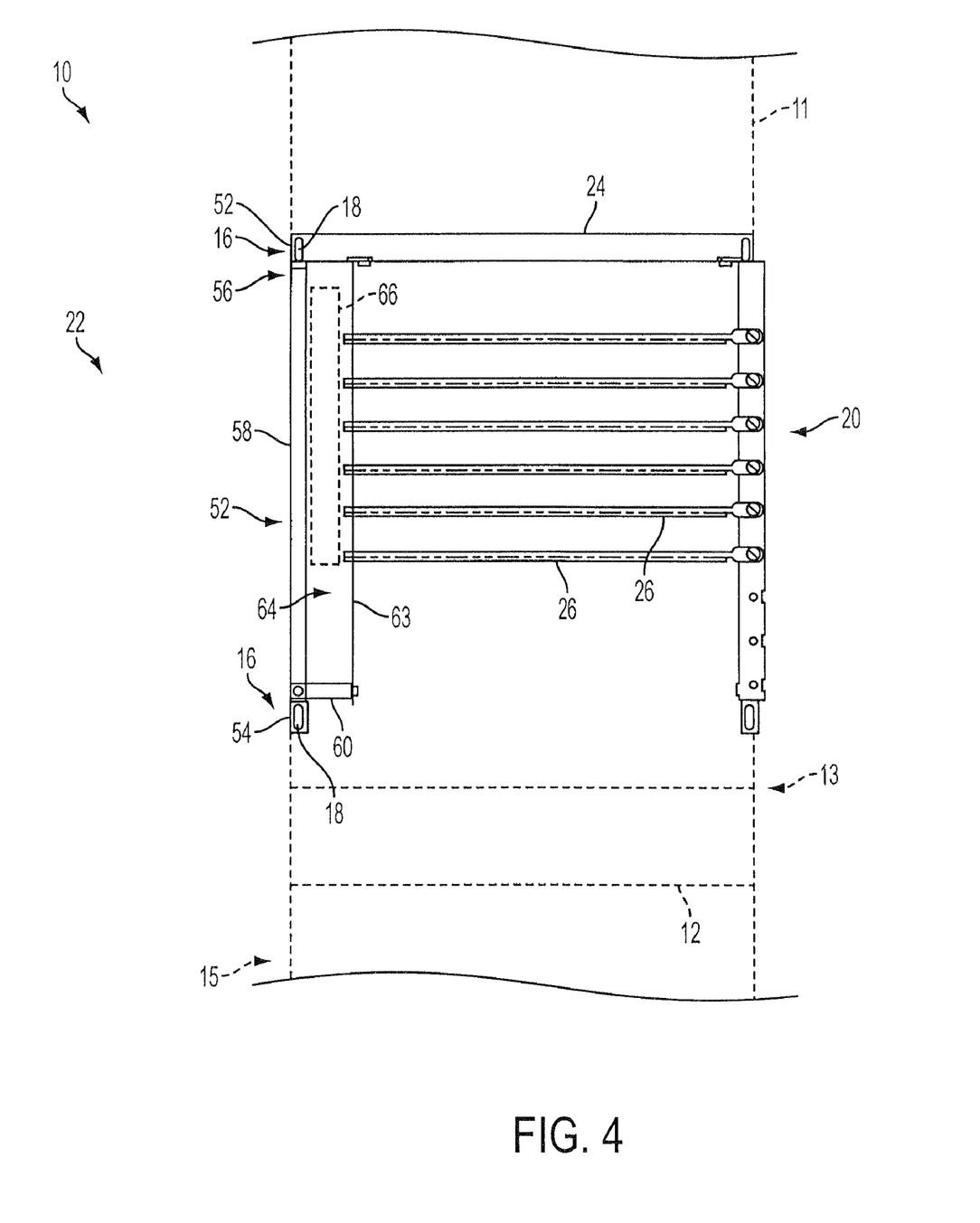
FIG. 4 is a front perspective view of cable management system shown in FIG. 1 consistent with the present disclosure.

According to one aspect, the second support 22, FIGS. 1 and 4, may be substantially similar to the first supports 20 described above. According to another embodiment, the second support 22 may include a strut 52 which may be configured to be disposed along at least a portion of the second side 15 of the rack 11. The strut 52 may include a first and a second base 54, 56 which may each be provided with at least one mounting device 16 (for example, the apertures or slots 18 configured to receive one or more fasteners) to couple the second support 22 to the second side 15 of the rack 11. The first and second mounting bases 54, 56 may be provided having a generally "L" or "hockey-stick" like shape. The strut 52 may also include one or more support braces 58 coupled to the first and second mounting bases 54, 56. The support brace 58 may be disposed a spaced distance outwardly from the second side 15 of the rack 11. For example, the support brace 58 may be coupled to an outer portion of the first and second mounting bases 54, 56.

The second support 22 may also include one or more angle braces 60 extending generally across a portion of the face of the rack 11. One end of the angle brace 60 may be coupled to the first and/or second mounting bases 54, 56 and/or the support brace 58. Another end of the angle brace 60 may be coupled to a second arm support 63.

The second arm support 63 may be configured to extend generally outwardly from face of the rack 11. For example, the second arm support 63 may extend substantially perpendicular to the face of the rack 11 as best seen in FIG. 1. Other configurations for the second arm support 63 are also possible. The second arm support 63 may be configured to be disposed substantially along a portion of the length of the second side 15 of the rack 11. For example, the second arm support 63 may be provided substantially parallel to the second side 15 of the rack 11. A first end of the second arm support 63 may be configured to be coupled to the second support 22 and/or the top horizontal plate 24 as will be discussed further below.

Figure 5:
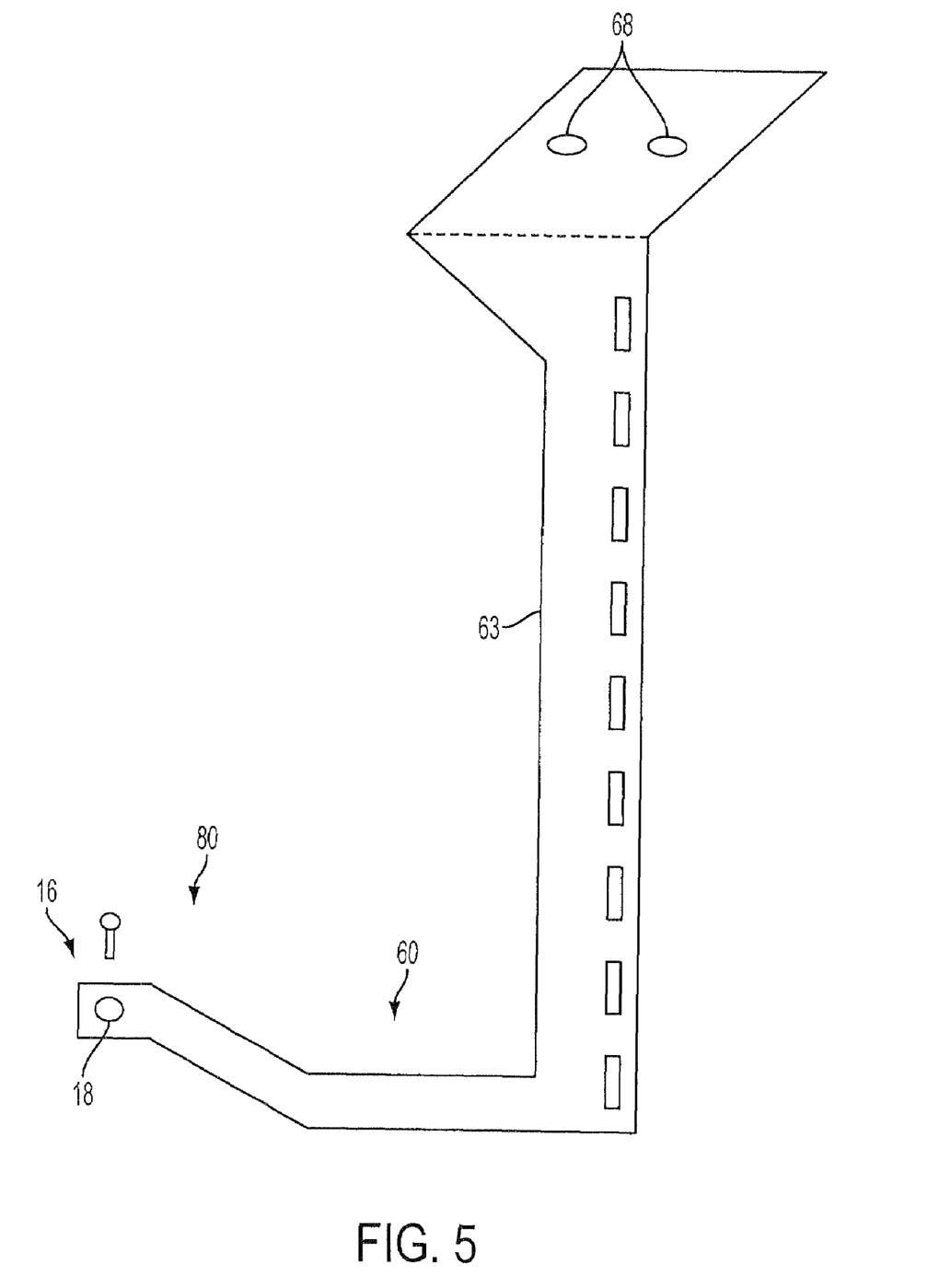
FIG. 5 is a front perspective view of another embodiment of the support consistent with the cable management system according to the present disclosure.

The second arm support 63 may be provided having a substantially solid geometry. The substantially solid second arm support 63 may increase the overall strength and rigidity of the frame 14 and/or second arm support 63 and may prevent cables 30 from being run from the second side 15 of the rack 11. According to another aspect, the second arm support 63, FIG. 5, may be provided having a generally open architecture. The generally open architecture may facilitate air flow in/out of the rack 11 behind the frame 14, thereby providing greater cooling for the power supplies and switches 12 coupled to the rack 11. Optionally, the angle brace 60 may be provided as an integral feature of the second arm support 63. The angle brace 60 may optionally include a base 80 including at least one mounting device 16 (for example, the apertures or slots 18 configured to receive one or more fasteners) to secure the angle brace 60 and the second arm support 63 to the rack 11.

The second support 22 may optionally be configured to define an area or cavity 64 sized and shaped to allow a fan card (generally indicated at 66 in FIG. 1) to be removed from the rack 11 without requiring the cable management system 10 to be removed from the rack 11. As shown, the second arm support 63 may be configured to extend outwardly from the rack 11 at a spaced distance inwardly away from the second side 15 and toward the first side 13 of the rack 11. The dimensions of the second support 22 may depend upon the intended application (for example, the size and shape of the fan card 66), and is considered within the knowledge of one of ordinary skill in the art.

Figure 6A:
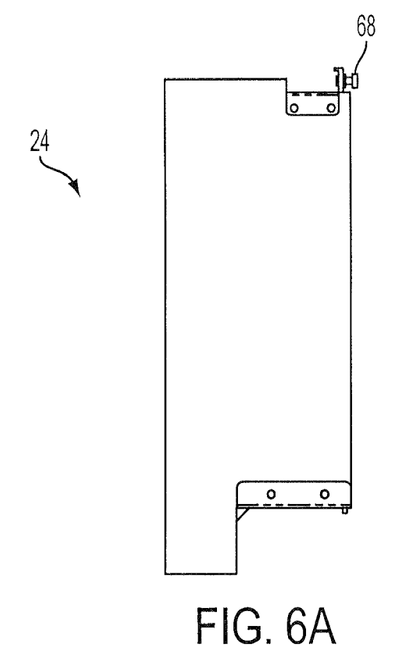
FIG. 6a is a top plane view of one embodiment of the top horizontal plate consistent with the cable management system according to the present disclosure having a generally solid configuration.
Figure 6B:
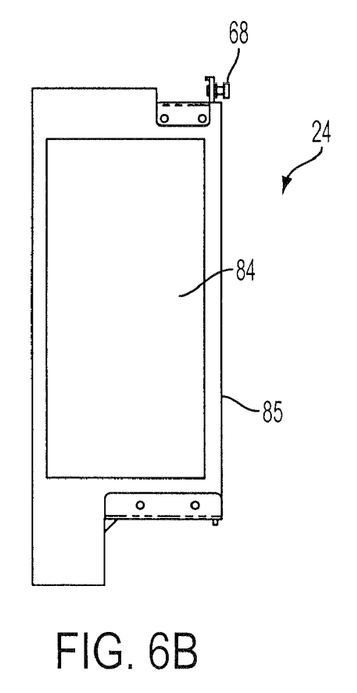
FIG. 6b is a top plane view of one embodiment of the top horizontal plate consistent with the cable management system according to the present disclosure having a generally open configuration.
Figure 6C:
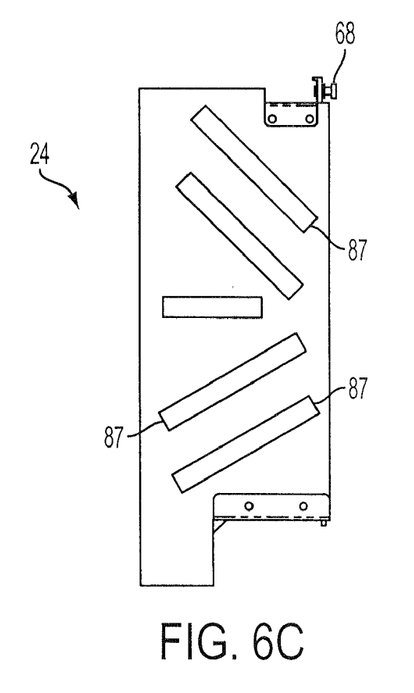
FIG. 6c is a top plane view of one embodiment of the top horizontal plate consistent with the cable management system according to the present disclosure having a plurality of cooling slots.

The frame 14 may optionally include a top horizontal plate 24, FIGS. 1, 4, and 6, configured to be coupled to a top portion of the frame 14. The top horizontal plate 24 may be removably coupled to the first and/or the second supports 20, 22 by way of one or more fasteners 68 (such as, but not limited to, a screw, bolt, rivet, or the like). The top horizontal plate 24 may also formed as an integral feature or permanently secured to the first and/or the second supports 20, 22 (for example, by way of welding, an adhesive, or the like).

According to one embodiment, the top horizontal plate 24, FIG. 6a, may be provided having a substantially solid geometry. The substantially solid geometry may increase the overall strength and rigidity of the frame 14. Additionally, the solid geometry may prevent users from running cables into the top area of the rack 11. According to another embodiment, the top horizontal plate 24, FIG. 6b, may be provided having a generally open configuration 84. For example, the top horizontal plate 24 may be provided having an outer frame 85 configured to define a generally open area 84. The generally open area 84 may optionally be provided with a mesh or screen to prevent cables from being run through the top horizontal plate 24. According to yet another embodiment, the top horizontal plate 24, FIG. 6c, may be provided having one or more slots or holes 87. The slots or holes 87 may provide increased airflow over the generally solid geometry of FIG. 6a, while also providing increased strength compared to the generally open configuration of FIG. 6b.

As discussed above, a plurality of arm 26, FIGS. 1, 2, and 4, may be configured to span across at least a portion of the front of the rack 11 and may be configured to be at least partially removably coupled to the first and/or second arm supports 33, 63 of the first and second supports 20, 22. For example, a first end 90, FIG. 7, of one or more of the arms 26 may be provided with one or more tabs or hooks 92 configured to be at least partially received in one or more slots or openings 94 in the second arm support 63 as generally shown in FIG. 1. A second end 96 of the arm 26 may include an aperture 98 configured to receive a fastener 99 (such as a screw, bolt, or the like) which may engage with the first arm support 33 to removably couple the arm 26 thereto. Other configurations are also possible. For example, the first end 90 may be provided having an aperture configured to receive a fastener (such as a screw, bolt, or the like) which may engage with the second arm support 63 to removably couple the arm 26 thereto. The second end 96 may also be provided having one or more tabs configured to be received in one or more slots in the first arm support 33. The second end 96 may also be provided with a hinge for hingedly coupling the second end 96 of the arm 26 to the first arm support 33.

According to an embodiment, the plurality of arms 26 may be configured to be coupled to the first and second arm mounting areas 33, 63 such that at least one arm 26 is disposed proximate a switch 12, for example, an outer, front face of the switch 12. The distance in which a least a portion of the arm 26 is spaced outwardly from the rack 11 (and specifically the switch 12) may be based on, at least in part, the number of cables 30, the size or gauge of the cables 30, the bend radius of the cables 30, the amount of space necessary to for maintenance and/or installation/removal of the switches 12, as well as other space considerations such as, but not limited to, doors or the like (not shown) which may be disposed about the front of the rack 11.

As can be best seen in FIG. 1, the plurality of cables 30 associated with a specific switch 12 may be run along at least a portion of one or more arms 26 associated with the switch 12 such that a terminal end of the cables 30 may be provide proximate a port (not shown) associated with the switch 12. According to one embodiment, only cables 30 associated with a specific switch 12 may be coupled to an arm 26. Consequently, a particular switch 12 may be more easily and quickly removed and/or installed from the rack 11 since only cables 30 associated with a specific switch 12 may be coupled to an arm 26. This may eliminate and/or reduce the need to sort-through and track down and cables 30 associated with other switches 12. To replace a particular switch 12, a user may disconnect the plurality of cables 30 associated with the particular switch 12 that are coupled to one or more arms 26. The plurality of cables 30 may remain substantially coupled to one or more of the arms 26, which may also be disconnected from the frame 14 (and specifically the first and second mounting areas 33, 63). The arms 26 and associated cables 30 may thus be moved out of the way to allow the switch 12 to be removed and/or installed into the rack 11.

The plurality of cables 30 may be coupled to the plurality of arms 26 in any manner known to those skilled in the art. For example, the plurality of cables 30 may be coupled to the plurality of arms 26 using one or more fasteners 61 including, but not limited to, hook and loop type fasteners, zip ties, clips, wire ties or the like. According to another aspect, one or more of the arms 26, FIG. 7, may be provided having a plurality of notches 100 configured to at least partially receive one or more cables 30. For example, the notches 100 may be configured to receive only a single cable 30. The arms 26 may be provided having a number of notches 100 corresponding to the number of ports (not shown) on the switch 12. As a result, the arm 26 may be provided having a one-to-one ratio of notches 100 to switch ports. The one-to-one notch/port ratio facilitates the installation/removal of a switch 12 may providing a more easily recognizable correlation between the various cables 30 and the ports on the switch 12.

According to another aspect, one or more of the arms 26 may be provided having notches 100 configured to at least partially receive two or more cables 30. For example, the notches 100 may be configured to receive two or more cables 30 in a top/bottom configuration and/or a side-by-side configuration.

One or more of the arms 26 may further be provided having two or more rows of notches 100. For example, an arm 26 may be provided having a first row 101 disposed along a top portion of the arm 26 and a second row 102 disposed along a bottom portion of the arm 26. The first row 101 of notches may be configured such that the openings of the notches 100 are facing generally upwards while the second row 102 of notches 100 may be configured such that the openings of the notches are facing generally downwards when installed on a typical rack installation. Other configuration for the rows 101, 102 of notches 100 are also possible. For example, two or more rows 101, 102 of notches 100 may be provided on the top and/or bottom surface of the arm 26.

Figure 7A:
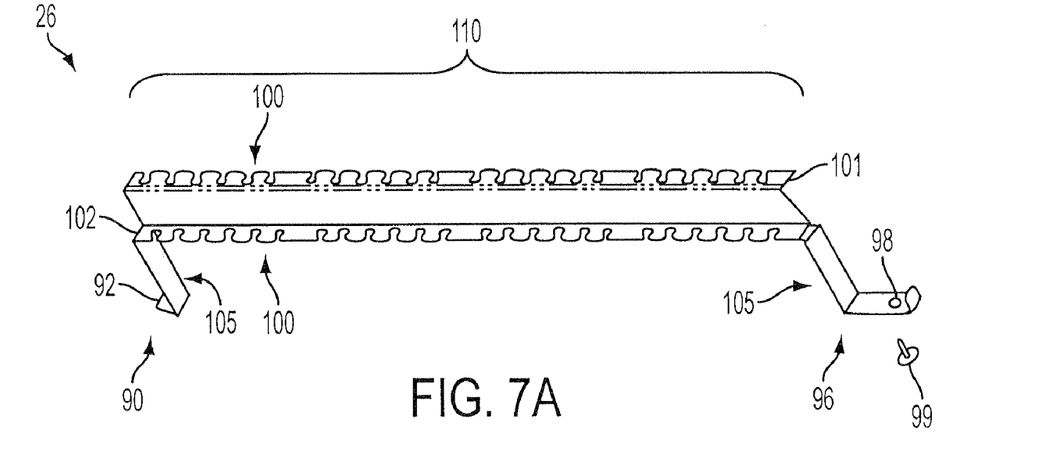
FIG. 7a is a front perspective view of one embodiment of a support arm consistent with the cable management system according to the present disclosure.
Figure 7B:
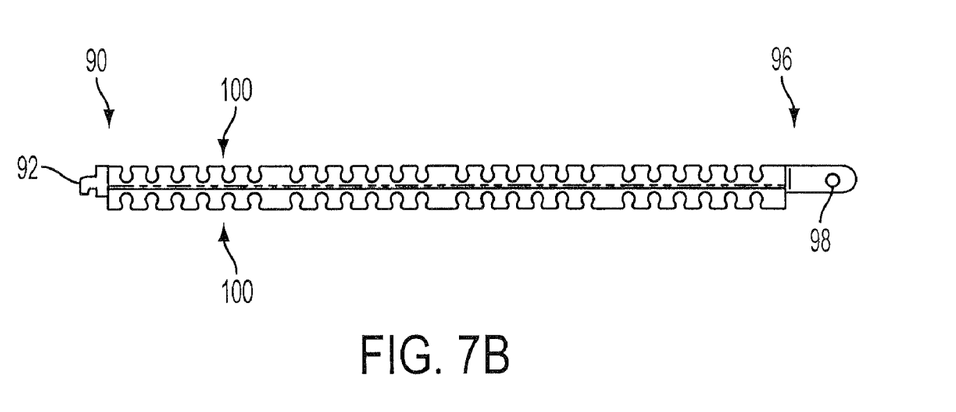
FIG. 7b is a front plan view of another embodiment of a support arm consistent with the cable management system according to the present disclosure.
Figure 7C:
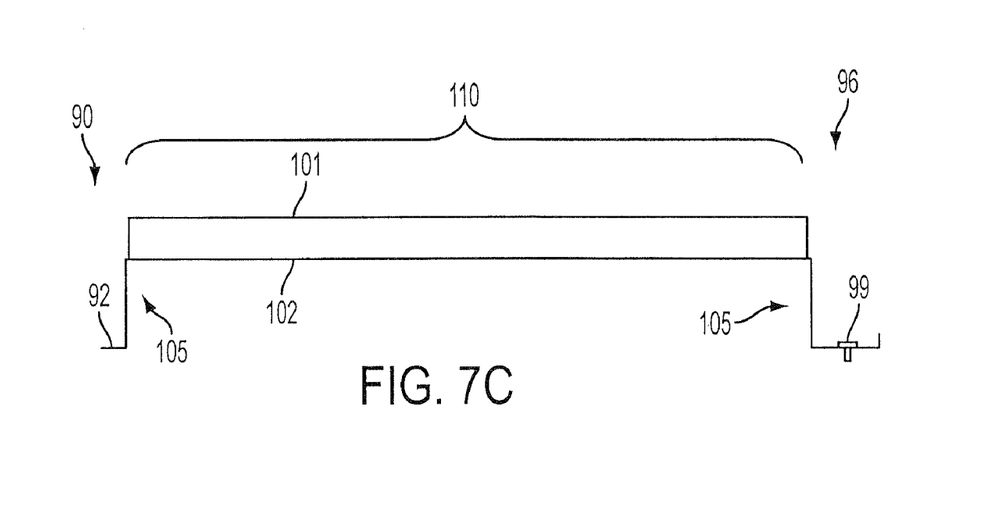
FIG. 7c is a top plan view of the support arm shown in FIG. 7a consistent with the cable management system according to the present disclosure.

According to one embodiment, the rows 101, 102 of notches 100 may be provided in substantially the same plane of the arm 26. For example, the rows 101, 102 of notches 100 may be provided in the substantially the same vertical plane of the arm 26 as shown in FIG. 7b. In another embodiment, the rows 101, 102 of notches 100 may be provided offset from each other as shown in FIGS. 7a and 7c. The offset arrangement of the rows 101, 102 of notches 100 may increase visualization of the port activation lights on the switches 12 and may provide an increased bend radius for the cables 30. Additionally, the offset arrangement may also increase the overall rigidity and/or strength of the arm 26. For example, the first and second rows 101, 102 of notches 100 may for a first and second support buttress which may increase the overall rigidity and/or strength of the arm 26. Moreover, the offset arrangement may allow the overall depth of the cable management system 10 to be decreased. The length of the bracket 105, having the strength of the dual angled offsets allows for the notched face to be extended further inward toward the switch 12. The arm with notches 100 in this configuration, having support closer toward the switch 12 and ports (not shown) would provide for an over all decrease in the cable management system depth.

According to another aspect, one or more of the arms 26 may be provided having a plurality of notches 100 that are recessed towards the rack 11 relative to the frame 14. As can best be seen in FIGS. 7a and 7c, the arm 26 may include one or more brackets 105 disposed proximate the ends 92, 96. The bracket 105 may be provided having a generally "L" shape wherein a portion of the bracket 105 is configured to be coupled to the first and/or second arm mounting areas 33, 63 of the first and second supports 20, 22. The arm 26 may further include an elongated central portion 110 having the plurality of notches 100. Recessing the plurality of notches 100 from the front of the frame 14 may reduce the overall depth of the cable management system 10 and, as a result, the cable management system 10 may fit in more applications. For example, recessing the plurality of notches 100 and the overall depth of the cable management system 10 may allow the cable management system 10 to fit behind doors of an existing application.

Moreover, recessing the plurality of notches 100 may provide for a greater bend radius for the cable 30. This may facilitate the coupling of the cables 30 to the plurality of arms 26 as well as facilitate coupling the cables 30 to the ports on the switches 12. Additionally, the increased cable bend radius may allow for an increased number of cables 30 to be coupled to an arm 26.

Recessing the plurality of notches 100 may also facilitate the organization and identification of the plurality of cables 30 coupled to the switch 12. Specifically, recessing the plurality of notches 100 may allow the cables 30 to be coupled to the arm 26 closer to the ports on the switch 12. As a result, less cable 30 may be disposed between the arm 26 and the ports on the switch 12, thereby making it easier to identify which notch 100 and/or cable 30 corresponds to a specific port on the switch 12.

Figure 7D:
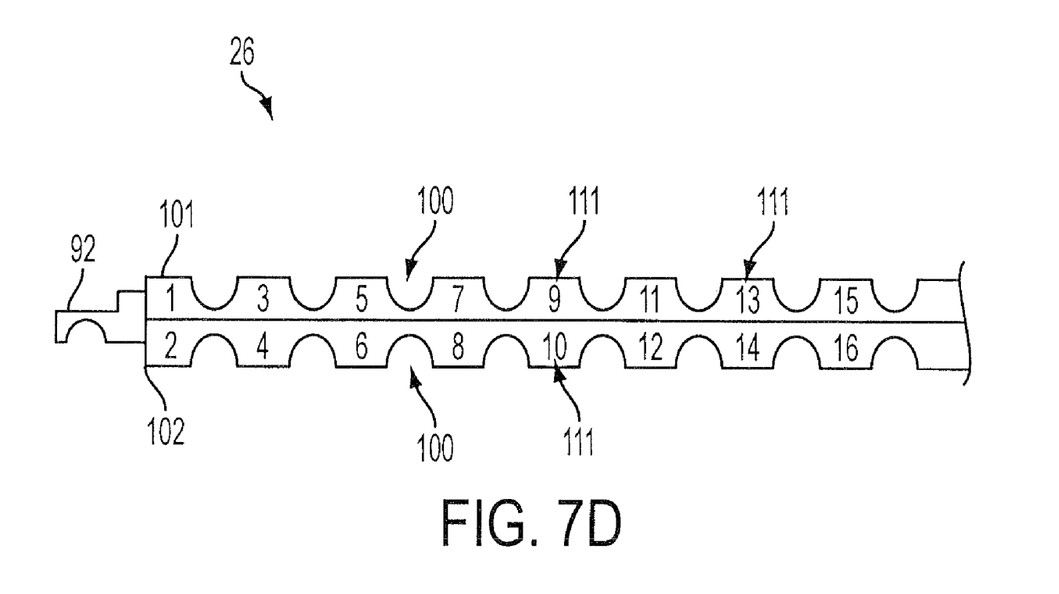
FIG. 7d is a front perspective view of one embodiment of a support arm consistent with the cable management system according to the present disclosure including notch/port indicia.

All of the aforementioned configurations of arms 26 may be provided with a label or identity marking/indicia 111, FIG. 7d, that may be embossed, adhered, screen printed, scribed or etched onto the face of the arm 26 adjacent or proximate to the individual notches 100. This labeling 111 may be configured to match or correspond to the switch 12 and port (not shown) identification, thus facilitating service, assembly, disassembly, installation and maintenance of data and information systems.

Reference in the specification to "one embodiment," "an embodiment," "one aspect," "an aspect" or the like in the present disclosure means that a particular feature, structure or characteristic described in connection with the embodiment is included in at least one embodiment of the present disclosure. Thus, the appearances of these phrases in various places throughout the specification may or may not refer to the same embodiment or all embodiments.

As mentioned above, the present disclosure is not intended to be limited to a system or method which must satisfy one or more of any stated or implied object or feature of the present disclosure and should not be limited to the preferred, exemplary, or primary embodiment(s) described herein. The foregoing description of a preferred embodiment of the present disclosure has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the present disclosure and its practical application to thereby enable one of ordinary skill in the art to utilize the present disclosure in various embodiments and with various modifications as is suited to the particular use contemplated. All such modifications and variations are within the scope of the present disclosure as determined by the claims when interpreted in accordance with breadth to which they are fairly, legally and equitably entitled.

What is claimed is:

1. A system comprising:
   at least one switch, said at least one switch configured to be coupled to a plurality of cables;
   a rack having at least a first and a second generally parallel side, said rack configured to receive and support said at least one switch between said first and said second generally parallel sides; and
   a cable management system comprising:
      a first support configured to be disposed along at least a portion of said first side of said rack, said first support including a first strut configured to be secured to said first side of said rack and a first arm support including at least one mounting area;
      a second support configured to be disposed along at least a portion of said second side of said rack, said second support including a second strut configured to be secured to said second side of said rack and a second arm support including at least one mounting area; and
      a plurality of arms configured to be coupled to said at least one mounting areas of said first and said second arm supports, wherein at least one of said plurality of arms comprises a plurality of notches configured to at least partially receive and retain at least one cable;
      a top plate configured to be secured to said first and said second supports, said top plate extending generally perpendicular to said first and said second generally parallel sides of said rack;
      at least one fan card configured to be removably coupled to said rack between said first and said second generally parallel sides and generally parallel with and along said second side of said rack, wherein said second strut and said second arm support are configured to allow said at least one fan card to be removed from said rack without removing said cable management system from rack;
      wherein a first end of said second arm support is configured to be coupled to said top plate and a second end of said second arm support is configured to be coupled to said second strut such that said second arm support is disposed generally parallel to said second side of said rack a distance away from said second side, said distance being greater than a width of a front face of said at least one fan card between said first and said second sides of said rack.

2. The system of claim 1, wherein said second strut comprises a first and a second base configured to be secured to said second side of said rack.

3. The system of claim 2, wherein said second arm support and said second strut define an open space.

4. The system of claim 2, wherein said second aim support and said second strut define a solid area.

5. The system of claim 1, wherein said first strut comprises a support brace extending generally parallel to said first side of said rack, said support brace comprising a first and a second end having a first and a second base, respectively, configured to be secured to said first side of said rack.

6. The system of claim 5, wherein said first aim support and said first strut define an open space.

7. The system of claim 1, wherein at least one of said plurality of arms comprises a first end region configured to be removably coupled to said first aim support and a second end region having at least one hook configured to engage with one of a plurality of slots disposed along a length of said second arm support.

8. The system of claim 1, wherein at least one of said plurality of arms comprises a plurality of notches equal to a number of ports on a front face of said at least one switch.

9. The system of claim 8, wherein each of said notches comprises indicia representing a single one of said number of ports of said at least one switch.

10. The system of claim 1, wherein at least one of said plurality of arms comprising a first row of notches arranged in a first direction and a second row of notches arranged a second direction.

11. The system of claim 10, wherein said first and said second rows are disposed in a first and second different plane.

12. A system comprising:
    at least one switch, said at least one switch configured to be coupled to a plurality of cables;
    a rack having at least a first and a second generally parallel side, said rack configured to receive and support said at least one switch between said first and said second generally parallel sides; and
    a cable management system comprising:
       a first support configured to be disposed along at least a portion of said first side of said rack, said first support including a first strut configured to be secured to said first side of said rack and a first arm support including at least one mounting area:
       a second support configured to be disposed along at least a portion of said second side of said rack, said second support including a second strut configured to be secured to said second side of said rack and a second arm support including at least one mounting area; and
       a plurality of arms configured to be coupled to said at least one mounting areas of said first and said second arm supports, wherein at least one of said plurality of arms comprises a plurality of notches configured to at least partially receive and retain at least one cable, wherein at least one of said plurality of arms comprising a first row of notches arranged in a first direction and a second row of notches arranged a second direction, and wherein said first and said second directions are generally opposite each other.

13. A system comprising:
    at least one switch, said at least one switch configured to be coupled to a plurality of cables;
    a rack having at least a first and a second generally parallel side, said rack configured to receive and support said at least one switch between said first and said second generally parallel sides; and
    a cable management system comprising:
       a first support configured to be disposed along at least a portion of said first side of said rack, said first support including a first strut configured to be secured to said first side of said rack and a first arm support including at least one mounting area;
       a second support configured to be disposed along at least a portion of said second side of said rack, said second support including a second strut configured to be secured to said second side of said rack and a second arm support including at least one mounting area; and
    a plurality of arms configured to be coupled to said at least one mounting areas of said first and said second arm supports, wherein at least one of said plurality of arms comprises a plurality of notches configured to at least partially receive and retain at least one cable, wherein at least one of said plurality of arms comprising a first row of notches arranged in a first direction and a second row of notches arranged a second direction, and wherein said first and said second rows of notches are disposed in a single plane.

14. The system of claim 13, wherein said single plane is generally parallel to a plane of said front face of said at least one switch.

15. A system comprising:
- at least one switch, said at least one switch configured to be coupled to a plurality of cables;
- a rack having at least a first and a second generally parallel side, said rack configured to receive and support said at least one switch between said first and said second generally parallel sides; and
- a cable management system comprising:
  - a first support configured to be disposed along at least a portion of said first side of said rack, said first support including a first strut configured to be secured to said first side of said rack and a first arm support including at least one mounting area;
  - a second support configured to be disposed along at least a portion of said second side of said rack, said second support including a second strut configured to be secured to said second side of said rack and a second arm support including at least one mounting area; and
- a plurality of arms configured to be coupled to said at least one mounting areas of said first and said second arm supports, wherein at least one of said plurality of arms comprises a plurality of notches configured to at least partially receive and retain at least one cable, wherein at least one of said plurality of arms comprising a first row of notches arranged in a first direction and a second row of notches arranged a second direction, and wherein said first and said second rows are disposed in first and second planes, respectively, which are offset with respect to one another and generally parallel to a plane of said front face of said at least one switch.

16. A system comprising:
- at least one switch, said at least one switch configured to be coupled to a plurality of cables;
- a rack having at least a first and a second generally parallel side, said rack configured to receive and support said at least one switch between said first and said second generally parallel sides; and
- a cable management system comprising:
  - a first support configured to be disposed along at least a portion of said first side of said rack, said first support including a first strut configured to be secured to said first side of said rack and a first arm support including at least one mounting area;
  - a second support configured to be disposed along at least a portion of said second side of said rack, said second support including a second strut configured to be secured to said second side of said rack and a second arm support including at least one mounting area; and
  - a plurality of arms configured to be coupled to said at least one mounting areas of said first and said second arm supports, wherein at least one of said plurality of arms comprises a plurality of notches configured to at least partially receive and retain at least one cable, wherein at least one of said plurality of arms comprising a first row of notches arranged in a first direction and a second row of notches arranged a second direction; and
  - wherein said at least one arm comprises a first and a second mounting bracket configured to removably secure said at least one arm to said first and said second arm support, respectively, said first and said second mounting bracket configured to arrange said first and said second rows of notches a spaced distance towards at least one switch.

17. A cable management system for use with a rack having at least a first and a second side configured to be coupled to at least one piece of electronic equipment, said cable management system comprising:
- a first support configured to be disposed along at least a portion of said first side of said rack, said first support including a first strut configured to be secured to said first side of said rack and a first arm support including at least one mounting area;
- a second support configured to be disposed along at least a portion of said second side of said rack, said second support including a second strut configured to be secured to said second side of said rack and a second arm support including at least one mounting area; and
- a plurality of arms configured to be removably coupled to said at least one mounting areas of said first and said second arm supports, wherein at least one of said plurality of arms comprises a first and a second row of notches arranged in a first and a second direction, respectively, said first and said second rows of notches configured to engage with at least one cable associated with said at least one piece of electronic equipment, wherein said first and said second directions are generally opposite each other.

18. The system of claim 17, wherein said at least one piece of electronic equipment comprises a switch comprising a number of ports on a front face thereof, wherein said at least one arm comprises a plurality of notches equal to said number of ports on said front face of said at least one switch.

19. The system of claim 18, wherein each of said notches comprises indicia representing a single one of said number of ports of said at least one switch.

20. The system of claim 17, wherein said first and said second rows are disposed in a first and second different plane.

21. A cable management system for use with a rack having at least a first and a second side configured to be coupled to at least one piece of electronic equipment, said cable management system comprising:
- a first support configured to be disposed along at least a portion of said first side of said rack, said first support including a first strut configured to be secured to said first side of said rack and a first arm support including at least one mounting area;
- a second support configured to be disposed along at least a portion of said second side of said rack, said second support including a second strut configured to be secured to said second side of said rack and a second arm support including at least one mounting area; and
- a plurality of arms configured to be removably coupled to said at least one mounting areas of said first and said second arm supports, wherein at least one of said plurality of arms comprises a first and a second row of notches arranged in a first and a second direction, respectively, said first and said second rows of notches configured to engage with at least one cable associated with said at least one piece of electronic equipment, wherein said first and said second rows of notches are disposed in a single plane.

22. The system of claim 21, wherein said single plane is generally parallel to a plane of said front face of said at least one piece of electronic equipment.

23. A cable management system for use with a rack having at least a first and a second side configured to be coupled to at least one piece of electronic equipment, said cable management system comprising:
- a first support configured to be disposed along at least a portion of said first side of said rack, said first support including a first strut configured to be secured to said first side of said rack and a first arm support including at least one mounting area;

a second support configured to be disposed along at least a portion of said second side of said rack, said second support including a second strut configured to be secured to said second side of said rack and a second arm support including at least one mounting area; and a plurality of arms configured to be removably coupled to said at least one mounting areas of said first and said second arm supports, wherein at least one of said plurality of arms comprises a first and a second row of notches arranged in a first and a second direction, respectively, said first and said second rows of notches configured to engage with at least one cable associated with said at least one piece of electronic equipment, wherein said first and said second rows are disposed in first and second planes, respectively, which are offset with respect to one another and generally parallel to a plane of said front face of said at least one switch.

24. A cable management system for use with a rack having at least a first and a second side configured to be coupled to at least one piece of electronic equipment, said cable management system comprising:

a first support configured to be disposed along at least a portion of said first side of said rack, said first support including a first strut configured to be secured to said first side of said rack and a first arm support including at least one mounting area wherein said first strut comprises:

a fixed mount portion comprising a support brace extending between a first and a second mounting base each configured to be secured to said first side of said rack; and an adjustable strut comprising an elongated portion having a first end region coupled to a third mounting base and a second end region, wherein said second end region is configured to engage with said support brace of said fixed mount portion such that a length of said first strut along said first side of said rack is adjustable;

a second support configured to be disposed along at least a portion of said second side of said rack, said second support including a second strut configured to be secured to said second side of said rack and a second arm support including at least one mounting area; and a plurality of arms configured to be removably coupled to said at least one mounting areas of said first and said second arm supports, wherein at least one of said plurality of arms comprises a first and a second row of notches arranged in a first and a second direction, respectively, said first and said second rows of notches configured to engage with at least one cable associated with said at least one piece of electronic equipment.

25. The system of claim 24, wherein at least one of said elongated portion and said support brace includes an elongated slot configured to engage with a fastener disposed through the other of said elongated portion.

* * * * *